Feb. 9, 1943.  S. N. BOBO  2,310,349
FOOD BROILER RACK
Filed Oct. 12, 1940
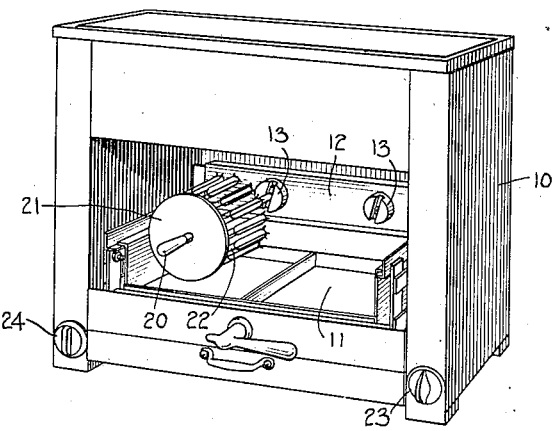
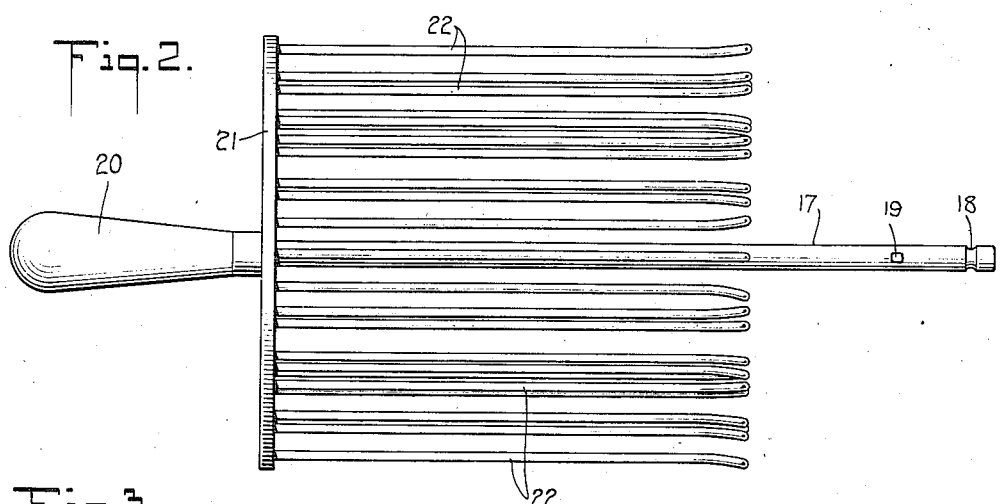
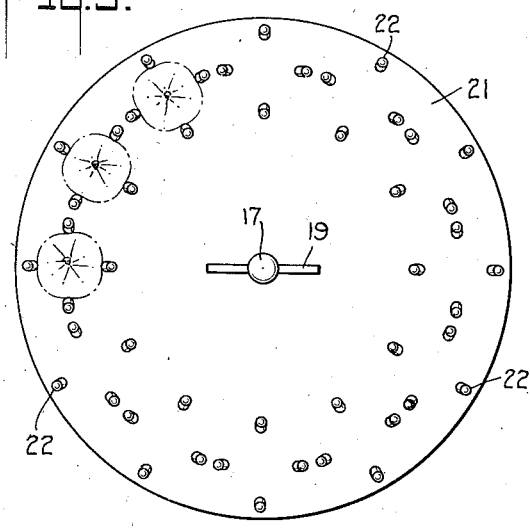
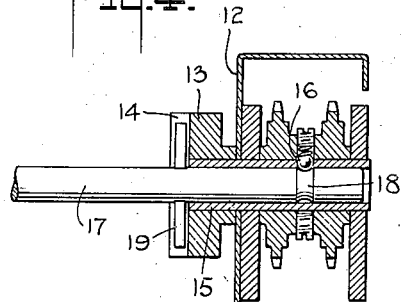
INVENTOR
Stephen N. Bobo
BY
HIS ATTORNEY Patented Feb. 9, 1943

2,310,349

UNITED STATES PATENT OFFICE 2,310,349

FOOD BROILER RACK

Stephen N. Bobo, New York, N. Y.

Application October 12, 1940, Serial No. 360,954

5 Claims. (Cl. 53—5)

My present invention relates to broiling apparatus, and more particularly to an improved food broiling rack.

In my copending application Serial No. 356,415, filed September 12, 1940, I have described and claimed an improved broiling apparatus on which the food to be broiled or baked is mounted on a rotatable spit or spits. In such apparatus the spit is rotated by any suitable source of mechanical power, and there is therein shown in the embodiment of the invention food in position to be roasted or broiled.

In order to render the device, above referred to, more general in its application I have devised a food holding rack for holding a special type of food in position in the broiling apparatus and the device is of such character as to be readily removable from and inserted in the broiling apparatus.

A type of apparatus forming the subject matter of the present invention is adapted particularly for the roasting or broiling of that type of food known as frankfurters, or sausage, or similar articles of food, and which heretofore have been very difficult to satisfactorily broil because of their substantially cylindrical form, and the proper broiling thereof was attended only by constant supervision and manipulation by the attendant.

An object of my invention is an improved food holding broiler rack.

Another object of my invention is an improved food holding broiler rack for holding a plurality of substantially cylindrical pieces of food simultaneously.

Another object of my invention is an improved frankfurter or sausage broiler rack.

In the accompanying drawing illustrating a preferred embodiment of my invention, Fig. 1 is a perspective view of a broiler or baker showing my present invention in position therein.

Fig. 2 is a side elevation of my improved food holding rack.

Fig. 3 is an end elevation viewed from the righthand side of Fig. 2 of the food holding rack, and Fig. 4 is an enlarged sectional elevation of the spit holding mechanism for holding the broiling rack in position in the device illustrated in Fig. 1.

Referring to the drawing, 10 designates generaly a baker or broiler in which radiating elements (not shown) are utilized to direct heat downwardly toward the bottom 11 of the device. Above the bottom 11 of the device and mounted on the back wall 12 are clutch or connector mechanisms 13 rotatably driven from any suitable source of power (not shown) in either direction at any desired rate of speed. Adapted to be associated with the clutch or connecting mechanism 13 is a food holding rack.

Referring to Fig. 4, one of the clutch or connecting mechanisms 13 is shown as being provided with a slot 14 and attached to a sleeve 15, such sleeve extending through the rear wall 12 of the device 10. Associated with the sleeve 15 is a spring ball clutch 16 adapted to engage with an associated part of one of the shafts of a food holding rack.

Referring to Figs. 2, 3 and 4, there is illustrated a shaft 17 of a food holding rack, the diameter of such shaft being substantially equal to the internal diameter of the sleeve 15 above referred to, and such shaft has formed therein adjacent one end a circumferential groove 18 with which cooperates the spring pressed ball clutch 16, as shown in Fig. 4. The circumferential groove 18 and spring ball clutch 16 engage sufficiently firm to prevent accidental removal of the shaft 17 from the sleeve 15, but such association is not sufficient to prevent the ready withdrawal or insertion of the shaft 17 in the sleeve 15 into or out of the position shown in Fig. 4.

Adjacent the circumferential groove 18 the shaft 17 is provided with a cross bar 19 adapted to engage in the slot 14 in the clutch or connector mechanism 13 when the shaft 14 is in position to have the circumferential groove 18 engaged by the spring pressed ball clutch 16. The shaft 17 is of any suitable length, the length being determined by the depth of the heating chamber in the device 10 and, secured at the end remote from the circumferential groove 18 is a handle 20.

Also secured to the shaft 18 adjacent the handle 20 is a disk 21, preferably of metal, and also preferably circular. On the face thereof remote from the handle 20 the disk 21 is provided with a plurality of rods 22 of resilient material. The rods 22 are arranged in groups adjacent the peripheral edge of the disk 21. Each group may be composed of any number of rods 22 desired. I find that four is a suitable number and, therefore, have illustrated the rods 22 as being arranged in groups, with each group consisting of four rods. The ends of the rods 22 remote from the disk 21 are bent outwardly from the center of the groups thus forming practically a bell-shaped mouth for each of the groups of rods 22. The rods 22 lie parallel to the shaft 17, and, therefore, when food in the form of frankfurters ore similar types of food are inserted in the groups or rods 22, the food is in the best position to be acted upon by the broiling or baking agent in the device 10.

Each of the groups of rods 22 is, as stated above, composed of four rods 22 of resilient material, the rods of each group being symmetrically arranged about a common center to thus define substantially a space in which may be held a portion of food such for example, as a frankfurter, and the group will hold such food in proper position to expose practically the entire surface of the food to the action of the baking or roasting heat.

When it is desired to utilize the present invention, the device 10 has the heat of the baking chamber controlled by the usual device 23 and the clutch connecting elements 13 are placed in motion by the operation of a switch 24, which controls the motive power. During this period the device shown in Fig. 2 may have the spaces defined by the groups of rods 22 loaded with the food in substantially cylindrical form, as for example, frankfurters, and when thus loaded, the operator by grasping the handle 20 forces the end of the shaft 19 into the central tubular member 15 of the clutch 13 and forces the said shaft inwardly therein until the circumferential groove 18 is engaged by the spring pressed ball clutch 16 and also until the cross bar 19 of the shaft 17 lies in the transverse slot 14 in the clutch member 13. The entire apparatus shown in Fig. 2 will thus be rotated and all portions of the surface of the food in the groups of elements 22 will be subjected to the baking or broiling heat. Should inspection of the food be necessary other than that obtained by the opening of the device 10, the operator by grasping the handle 20, which obviously may be of non-heat conducting material, may remove the disk 21 with attached groups of rods 22 from the position shown in Fig. 1. After inspection the same may be replaced in the device 10, or, if by this time the food has reached the proper stage of cooking, the food may be readily slipped out of the spaces defined by groups of rods 22.

Whereas I have described my invention by reference to specific forms thereof, it will be understood that many changes and modifications may be made without departing from the spirit of the invention.

I claim:

1. A broiler comprising a housing open at one side; heating means disposed within the housing; food receiving means including a shaft, food receiving elements carried by the shaft, and handle means accessible at the open side of the housing for grasping and removing the food receiving means from within the housing; and single means disposed within the housing for wholly supporting and rotating the shaft and therewith the food receiving means.

2. A broiler comprising a housing open at one side; heating means disposed within the housing; food receiving means including a disk, food receiving elements carried by said disk and arranged in groups for individually receiving food, a shaft carrying said disk and having at one end coupling means, means disposed within the housing coacting with the coupling means of said shaft for rotating and wholly supporting said shaft, and handle means accessible at the open side of the housing and secured to the opposite end of the shaft.

3. A broiler comprising a housing open at one side; heating means disposed within the housing; food receiving means including a shaft, food receiving elements carried by the shaft, and handle means accessible at the open side of the housing for grasping and removing the food receiving means from within the housing; and single means disposed within the housing for horizontally wholly supporting and rotating the shaft and therewith the food receiving means.

4. Food receiving device for a broiler or the like comprising a disk, a handle attached to one side of the disk, food receiving elements carried by the disk and arranged in groups for individually receiving food, and a shaft carrying the disk and having at one end suitable means for removable coupling with suitable coupling rotating means, whereby the food receiving device is wholly supported at such one end of the shaft.

5. Food receiving means including a disk, a handle attached to one side of the disk, substantially straight resilient food receiving elements arranged in groups for individually receiving food, and a shaft carrying the disk and having at one end suitable means for removable coupling with suitable coupling rotating means, whereby the food receiving device is wholly supported at such one end of the shaft.

STEPHEN N. BOBO.